(No Model.)
J. HEMPHILL.
APPARATUS FOR WELDING TUBES.
No. 384,975. Patented June 26, 1888.
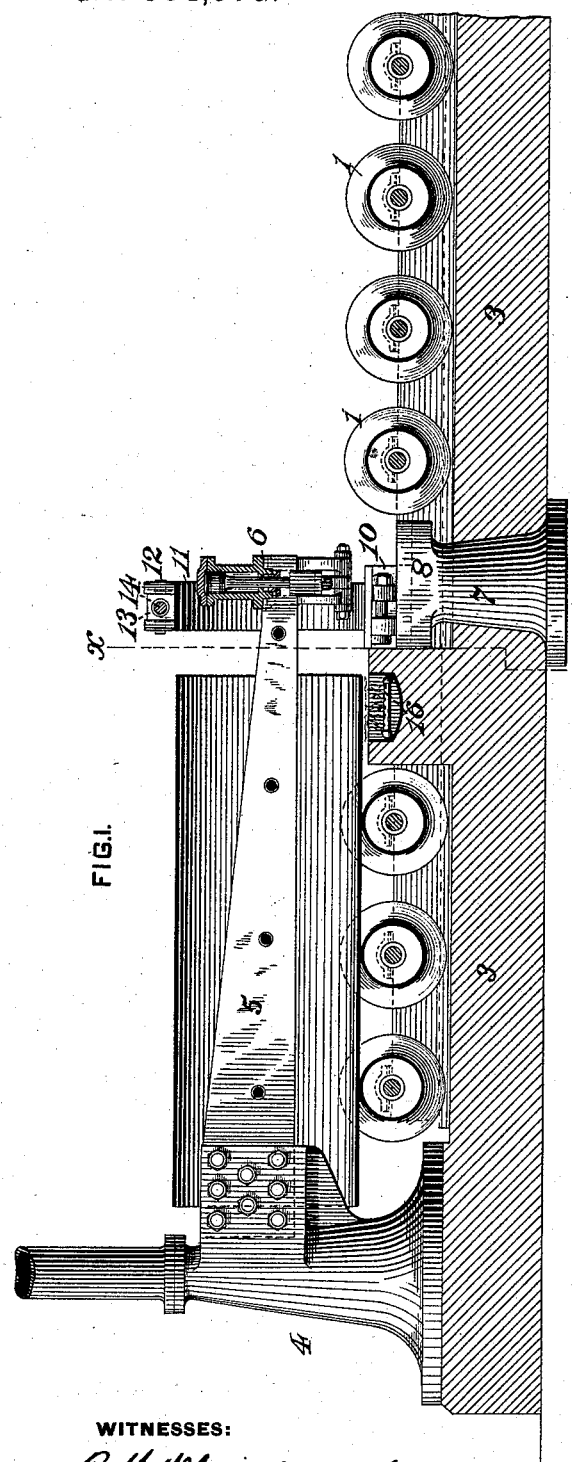
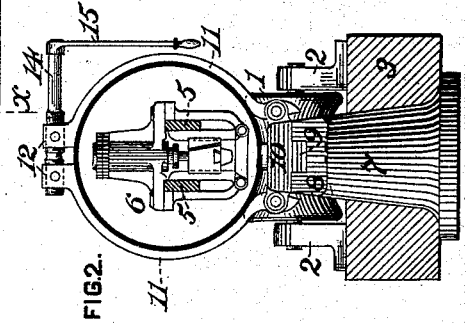
WITNESSES:
INVENTOR,
James Hemphill.
by Darwin S. Wolcott, Att'y.

UNITED STATES PATENT OFFICE.

JAMES HEMPHILL, OF PITTSBURG, PENNSYLVANIA.

APPARATUS FOR WELDING TUBES.

SPECIFICATION forming part of Letters Patent No. 384,975, dated June 26, 1888.

Application filed February 15, 1888. Serial No. 264,062. (No model.)

*To all whom it may concern:*

Be it known that I, JAMES HEMPHILL, a citizen of the United States, residing at Pittsburg, in the county of Allegheny and State of Pennsylvania, have invented or discovered a certain new and useful Improvement in Apparatus for Welding Tubes, of which improvement the following is a specification.

The invention herein relates to certain improvements in apparatus for forming large cylinders or tubes for boilers and other purposes. It has heretofore been customary in making cylinders or tubes of large diameter to unite the edges of the metal sheets therefor by rivets; but the holes drilled or punched for the rivets greatly weaken the sheets at such places.

The object of the invention herein is to provide an apparatus wherein the edges of the sheets may be united by welding, thereby avoiding any weakening of any part of the cylinder or tube.

In general terms the invention consists in the construction and combination of mechanical devices or elements, all as more fully hereinafter described and claimed.

In the accompanying drawings, forming a part of this specification, Figure 1 is a sectional elevation of my improved apparatus; and Fig. 2 is a transverse section on the line *x x*, Fig. 1, the tube having been shifted in position for welding.

In the practice of my invention a series of grooved friction-rolls, 1, are arranged in line with each other, their bearings 2 being supported in a suitable foundation, 3. At one end of the foundation is firmly secured a post or pillar, 4, to which are fastened arms 5 of suitable length, extending over the friction-rolls and carrying at their outer ends a small steam-hammer, 6. An anvil-block, 7, is arranged below the hammer and in line with the friction-rolls, said block being provided with a head, 8, extended on both sides of the block and parallel with the line of feed of the rolls 1. (See Fig. 1.) This head 8 is grooved longitudinally, as shown in Fig. 2, for the reception of a tongue, 9, formed on the under side of the anvil 10, such construction permitting of the longitudinal movement of the anvil, as hereinafter described.

Clamping-arms 11 are hinged on each side of the anvil, as shown in Fig. 2, and said arms are curved to correspond with the curvature of the tube or cylinder to be welded, and are provided at their upper ends with lugs 12, which are slotted, as shown in Fig. 1, for the reception of the oppositely-threaded nuts 13, pivotally mounted in said lugs, so as to permit of a rocking movement of the nuts as the arms approach or recede from each other, thereby avoiding any binding of the nuts upon the right and left hand threaded rod 14 employed for adjusting the arms. The pitch of the threads of the screw and nuts is such that a small movement of the operating-handle 15 will be sufficient to tighten and loosen the arms around the tube or cylinder.

In close proximity to the anvil is arranged a furnace, 16, for heating the edges of the tube or cylinder to a welding heat.

In using my improved plant the sheet is first bent into cylindrical shape, with its adjacent edges overlapping or in close proximity to each other, in order that both may be uniformly heated. This partially-formed tube is then slipped over the hammer and its supporting-arms 5 until its front end rests above the furnace, the main portion of the cylinder being supported by two or more of the friction-rolls 1, as shown in Fig. 1. After the portion of the edges above the furnace has been sufficiently heated, the cylinder is pushed forward between the clamping-arms until the heated portion rests upon the anvil. The clamping-arms are then closed around the cylinder until the adjacent edges have been properly overlapped. The hammer is then operated to weld the edges together, the anvil and the cylinder being gradually moved along to bring the entire heated portion under the action of the hammer. After the heated portion has been welded, as above described, the anvil, having the tube or cylinder clamped thereto, is pushed back to the rearward limit of its movement, the clamping-arms loosened, and the tube or cylinder adjusted so as to bring the next succeeding portion thereof over the furnace so as to heat its edges to a welding heat.

If desired, the anvil may be made stationary and the clamps movable, thereby permitting of the shifting of the tube along the anvil.

I claim herein as my invention—

1. In an apparatus for welding tubes, the combination of an anvil for supporting the tube or cylinder and a steam-hammer operative within the cylinder, substantially as set forth.

2. In an apparatus for welding tubes, the combination of a movable anvil for supporting the tube or cylinder and a steam-hammer operative within the tube or cylinder, substantially as set forth.

3. In an apparatus for welding tubes or cylinders, the combination of an anvil having clamping-arms hinged thereto and a steam-hammer operative within the tube or cylinder, substantially as set forth.

4. In an apparatus for welding tubes or cylinders, the combination of an anvil for supporting the tube or cylinder, a steam-hammer operative within the tube or cylinder, and a heating-furnace in the line of movement of the tube or cylinder along the anvil, substantially as set forth.

In testimony whereof I have hereunto set my hand.

JAMES HEMPHILL.

Witnesses:
DARWIN S. WOLCOTT,
R. H. WHITTLESEY.